United States Patent [19]
Lenny

[11] 3,744,314
[45] July 10, 1973

[54] FUEL GAUGES

[76] Inventor: Charles M. Lenny, 314 Tampa Avenue, Indialantic, Fla. 32901

[22] Filed: Jan. 27, 1971

[21] Appl. No.: 110,145

[52] U.S. Cl. .............................. 73/304 C, 324/61 R
[51] Int. Cl. ............................................ G01f 23/26
[58] Field of Search .................. 73/304 C; 317/246; 340/244 C, 244 R; 324/61 R

[56] References Cited
UNITED STATES PATENTS

| | | | |
|---|---|---|---|
| 2,824,449 | 2/1958 | Childs | 73/304 C |
| 2,919,579 | 1/1960 | Gronner | 73/304 C |
| 3,375,716 | 4/1968 | Hersch | 340/244 C |
| 3,432,840 | 3/1969 | Neapolitakis | 340/244 R |

FOREIGN PATENTS OR APPLICATIONS

| | | | |
|---|---|---|---|
| 795,590 | 5/1958 | Great Britain | 73/304 C |
| 636,545 | 2/1962 | Canada | 73/304 R |

*Primary Examiner*—Donald O. Woodiel
*Assistant Examiner*—Denis E. Corr

[57] ABSTRACT

Two coaxial tubes serving as plates of a capacitor to sense level of liquid. The level of liquid between the tubes being in proportion to the liquid level to be sensed. A circuit is provided responsive to the capacitance between the tubes including apparatus to vary the gain of an amplifier of the circuit to be lower at lower levels of the liquid.

2 Claims, 3 Drawing Figures

Patented July 10, 1973                3,744,314

INVENTOR

FUEL GAUGES

This invention pertains to liquid level measuring system of the electrical capacitance type and more specifically to a system that includes a capacitive sensor, an amplifier unit and an indicating meter.

In the disclosed embodiment of the present invention, a capacitive sensor is acted upon by a non electrical conducting liquid such as fuel and a radio frequency signal is imposed on both the sensor and a fixed capacitor in a bridge type circuit.

Any unbalance in the bridge circuit is detected and amplified to drive the indicating meter thereby showing the level of the liquid on the sensor.

It is the object of this invention to provide a sensor for tanks previously inaccessible for indirect measurement of liquid level.

It is the further object of this invention to provide an electronic driving or control means for meters designed and intended to be automotive instruments and formerly controlled only by a variable resistor device.

These and other objects of this invention will become apparent to those skilled in the art upon consideration of the accompanying specifications, claims, and drawings.

Referring to the drawings, wherein like characters indicate like parts throughout the figures.

Figure 1:
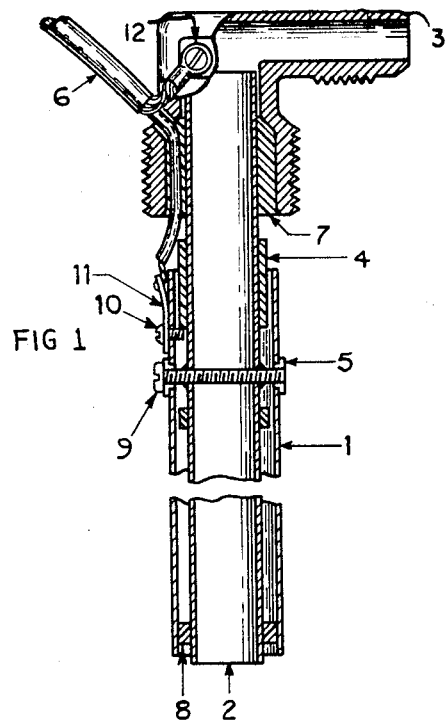
FIG. 1 is an axial sectional view of an embodiment of the present invention.

The numeral 3 in FIG. 1 designates an "L" shaped plumbing fitting such as would be found typically on a boat fuel tank and adapts from a commercial pipe fitting at the lower end to a flare tubing at the other end. This is mechanically joined by means of brazing or the like to a tube 2 which make an assembly commonly referred to as the "draw tube," used in drawing fuel or other liquid from a tank. The numeral 1 designates a concentric tube to 2 that is held rigidly in place through the action of insulators 4 and 5. Insulators 4 and 8 serve to locate tube 1 radially whereas insulator 5 is supported by screw 9 to position tube 1 axially.

Wire 6 is a coaxial cable suitable for carrying radio signals terminated in its shield by lug 12 attached to fitting 3, and terminated in the inner conductor at lug 11 which is secured to tube 1 by screw 10. The inner conductor of wire 6 is encased in plastic 7 to form a seal against leakage.

Figure 2:
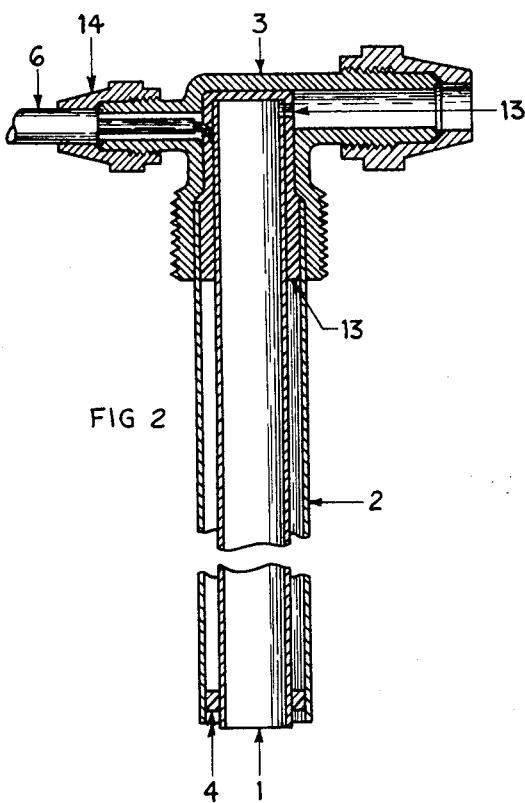
FIG. 2 is a sectional view of an inverted construction of the invention.

FIG. 2 shows an inverted construction of the draw tube sensor in which active tube 1 is mounted internally to tube 2 instead of external as in FIG. 1. Tube 2 is fastened to 3 by means of brazing or the like and tube 1 is supported by insulators 5 and 4. Wire 6 is fastened in its inner conductor to tube 1 by soldering or the like and is affixed to fitting 3 by clamping collar 14. A hole designated 13 is included in insulator 5 to allow free passage of fuel.

Figure 3:
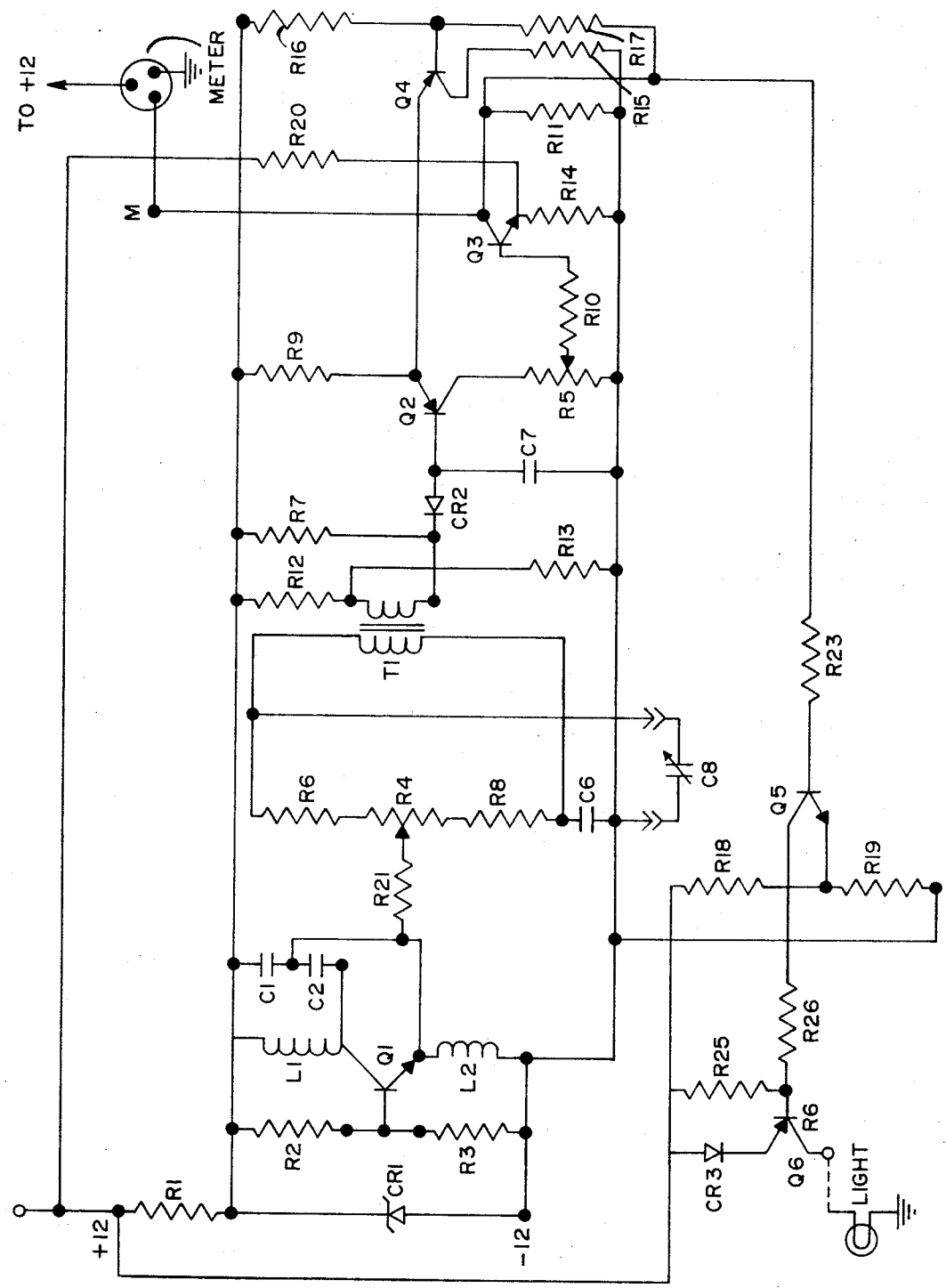
FIG. 3 is a schematic diagram of an electrical circuit which could be employed in conjunction with the sensor.

FIG. 3 is the schematic diagram of the electronic circuitry which is used in conjunction with the capacitive sensor. R 1 and Cr 1 effect a Zener voltage regulating system of convention familiar to anyone skilled in the arts. Resistors R2, and R3 combine with components L1, Q1, L2, C1 and C2 to form the well known Colpitts oscillator. Resistors R21, R4, R6 and R8 combine with capacitors C6 and C8 to form a Wheatstone Bridge. Isolation transformer T1 carries the unbalance signal to Cr2 and C7 which act as a detecting network to develop a DC voltage proportional to the unbalance out of the bridge. The sensor is represented by capacitor C8 in the bridge circuit. The presence of fuel on the sensor changes this capacity and hence the balance of the bridge.

Resistors R12 and R13 establish a bias on transistor Q2 which is half of a differential amplifier with Q4 being the other half. R9 is the common emitter resistor for the differential amplifier and R5 is the output signal resistor with a variable gain adjustment. Q3 is the driver transistor for the indicating meter which is of the automotive type being a two coil moving vane device. Resistors R20 and R14 establish a bias network for Q3 and R11 is a limiting resistor which reduces the gain of the system as the meter approaches an empty indication. Resistors R17 and R16 form a variable bias network for Q4. The bias varies with the collector voltage of Q3 and is negative in its effect on amplifier gain. It compensates for thermal effects of Q3 in addition to line voltage variations seen through the meter coils.

Transistors Q5 and Q6 form a low level warning system. Q5 is the turn on transistor whose emitter voltage is fixed by resistors R18 and R19 and whose base voltage is determined by the voltage of the emitter of Q3 such that as the meter reading approaches Empty the base voltage is sufficiently positive to turn on transistor Q5. Q5 in turn energizes Q6 which controls the warning light. R25 and Cr3 work together to insure that Q6 turns off.

Thus a liquid level sensing system has been described having a combination draw tube and sensing element plus an electronic amplifier capable of driving a two coil type indicating meter. Because of the novel sensor construction the device achieves great utility, but many type amplifiers could be used in conjunction with the sensor and also other type meters could be used equally as well.

While I have shown and described specific embodiments of this invention, further modifications and improvements will occur to those skilled in the art. I desire it to be understood, therefore, that this invention is not limited to the particular forms shown and I intend in the appended claims to cover all the modifications which do not depart from the spirit and scope of this invention.

What is claimed is:

1. In a device which responds to the level of a liquid:
   a. a first tube which is adapted to be used as one plate of a capacitor and which first tube supports a second tube as a second plate of said capacitor, the tubes having a space therebetween which is partially filled by said liquid in proportion to said level, said liquid being a dielectric in said space;
   b. circuit means which is responsive to the value of said capacitor and which produces a first signal which is representative of said level of said liquid;
   c. a differential amplifier having two inputs one of which is said first signal, and having an output which is a function of said two inputs;
   d. driver means for driving a meter, said driver means being responsive to said output of said differential amplifier and also providing a third signal which determines the other of said inputs of said differential amplifier; and e. limiting means connected to said driver means to make the gain of said differential amplifier and the said driver means variable in order to reduce the gain at lower levels of said liquid.

2. The device of claim 1 including indicator means wherein there is provided means controlled by said third signal to switch on and off said indicator means.

* * * * *